(12) United States Patent
Roth et al.

(10) Patent No.: US 8,567,317 B2
(45) Date of Patent: Oct. 29, 2013

(54) THERMAL INDICATORS

(75) Inventors: Joseph D Roth, Springboro, OH (US); Wendell B Halbrook, Jr., Waynesville, OH (US)

(73) Assignee: NCR Corporation, Duluth, GA (US)

(*) Notice: Subject to any disclaimer, the term of this patent is extended or adjusted under 35 U.S.C. 154(b) by 0 days.

(21) Appl. No.: 13/314,567

(22) Filed: Dec. 8, 2011

(65) Prior Publication Data

US 2012/0236096 A1 Sep. 20, 2012

Related U.S. Application Data

(62) Division of application No. 11/365,190, filed on Mar. 1, 2006, now Pat. No. 8,083,423.

(51) Int. Cl.
*B41F 33/00* (2006.01)

(52) U.S. Cl.
USPC .......................................... 101/488; 101/484

(58) Field of Classification Search
USPC ....................................................... 101/488
See application file for complete search history.

(56) References Cited

U.S. PATENT DOCUMENTS

| | | | | |
|---|---|---|---|---|
| 5,712,673 A * | 1/1998 | Hayashi et al. | | 347/217 |
| 5,748,204 A * | 5/1998 | Harrison | | 347/2 |
| 5,873,604 A * | 2/1999 | Phillips | | 283/70 |
| 6,151,037 A * | 11/2000 | Kaufman et al. | | 347/2 |
| 6,203,069 B1 * | 3/2001 | Outwater et al. | | 283/88 |
| 6,452,873 B1 * | 9/2002 | Holt et al. | | 368/327 |
| 7,049,263 B2 * | 5/2006 | Kumamoto | | 502/126 |
| 7,387,984 B2 * | 6/2008 | Yoneshige et al. | | 503/207 |
| 7,914,213 B2 * | 3/2011 | Scarton | | 400/76 |
| 2005/0000657 A1* | 1/2005 | Bronson | | 156/384 |

* cited by examiner

*Primary Examiner* — Anthony Nguyen
(74) *Attorney, Agent, or Firm* — Joseph Mehrle; Michael Chan

(57) ABSTRACT

A thermal indicator using indicia formed by opaque ink applied to a thermal imaging material element is described. The ink is substantially the same color as the imaging element background and remains substantially hidden until the imaging element background changes color when heated. Time-temperature exposure indicating labels can be prepared using a printer with direct thermal type and ink jet type print heads.

12 Claims, 3 Drawing Sheets

THERMAL INDICATORS

RELATED APPLICATIONS

This application is a Divisional Application of, and claims priority to, U.S. application Ser. No. 11/365,190, filed Mar. 1, 2006, now U.S. Pat. No. 8,083,423 entitled "THERMAL INDICATORS," which is hereby incorporated by reference herein in its entirety for all purposes. This application is also related to the following other Divisional Applications of U.S. application Ser. No. 11/365,190, which includes U.S. application Ser. No. 13/314,629, filed Dec. 8, 2011, and U.S. application Ser. No. 13/314,714, filed Dec. 8, 2011.

BACKGROUND

Direct thermal printing is a recognized means of printing quietly without toners or inks. It is a relatively mature technology that has been around for over forty years. Its use by retailers for printing of cash register receipts, mailing labels, etc. is now commonplace.

In direct thermal printing, a print head selectively applies heat to paper or other sheet media comprising a substrate with a thermally sensitive coating. The coating changes color when heat is applied, by which "printing" is provided on the coated substrate. For dual-sided direct thermal printing, the sheet media substrate may be coated on both sides.

Time-temperature indicators using thermally sensitive color change materials are well known. For example, indicator devices that relay on diffusion of a dye through a polymer are described in U.S. Pat. Nos. 6,214,623; 5,746,792; 5,057,434; and 4,212,153.

SUMMARY

A thermal indicator using indicia formed by opaque ink applied to a thermal imaging material element is described. The ink is substantially the same color as the imaging element background and remains substantially hidden until the imaging element background changes color when heated. Time-temperature exposure indicating labels can be prepared using a printer with direct thermal type and ink jet type print heads.

Other features, advantages and variations of the invention will be apparent from the following description and the appended drawings and claims.

DESCRIPTION

By way of example, various embodiments of the invention are described in the material to follow with reference to the included drawings. Variations may be adopted.

Figure 1:
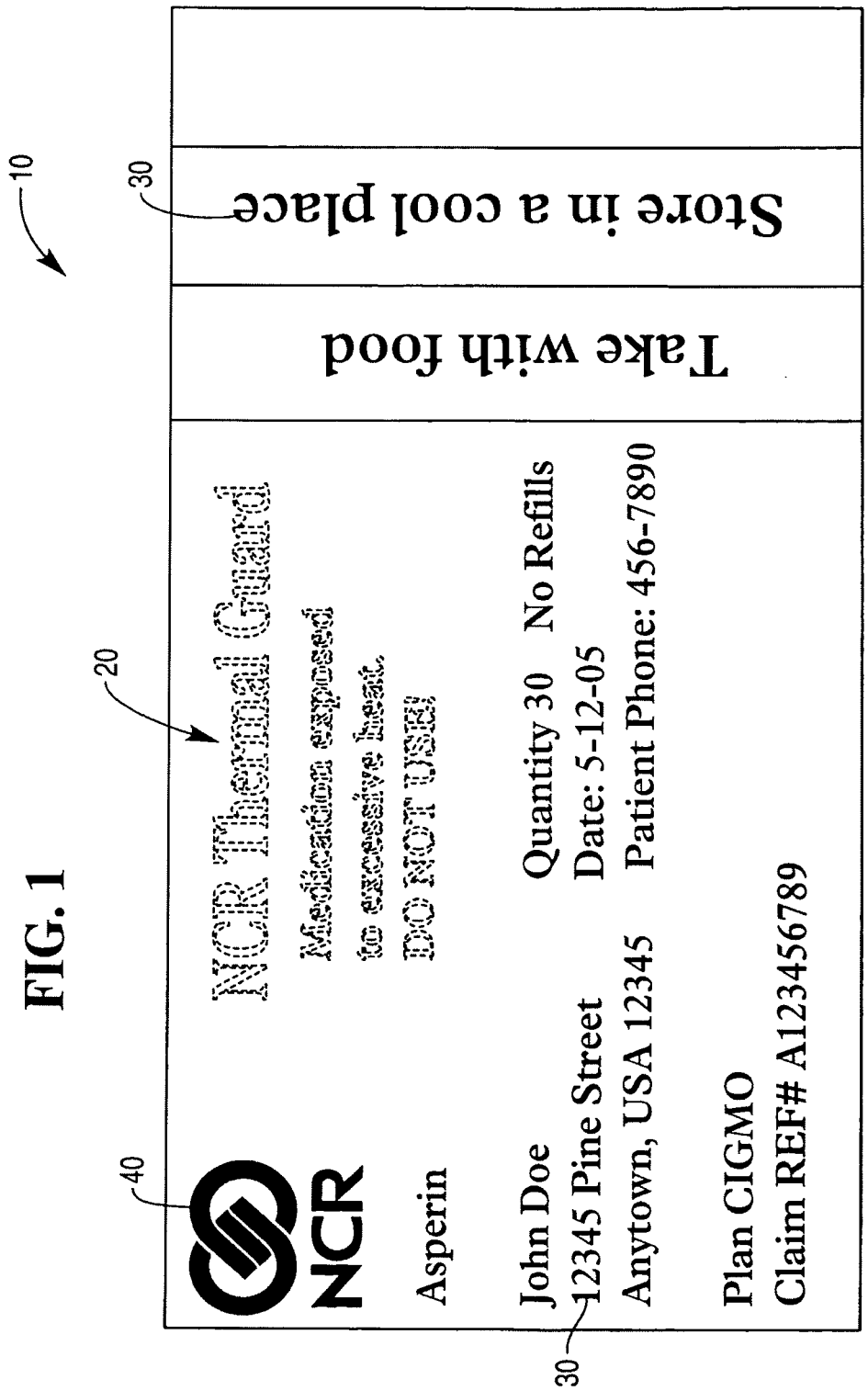
FIG. 1 illustrates a thermally sensitive label with hidden opaque printing before exposure to excessive heat.

FIG. 1 illustrates a thermally sensitive label 10 with hidden opaque printing 20 before exposure to excessive heat. The label 10 comprises a substrate with one or more thermally sensitive coatings, e.g., permitting direct thermal printing 30 on the label 10 in a manner well known in the art. The label 10 may also include printed material such as a logo 40 added by direct thermal printing, inkjet printing, lithographic process, flexographic printing or the like. Conventional direct thermal printing paper can be used for the exemplary labels 10.

In the example shown in FIG. 1, the initial background color of the label 10 is white. The hidden opaque printing 20 would match this background color so as to be essentially invisible before the label 10 is exposed to excessive heat. In this example the color of the opaque printing 20 would be white. The visibility of the hidden opaque printing 20 in FIG. 1 is for illustration only, where again the opaque printing 20 would be substantially invisible in actual practice against the background of the label 10. The hidden printing 20 could be added to the label 10 by inkjet printing, for example.

Figure 2:
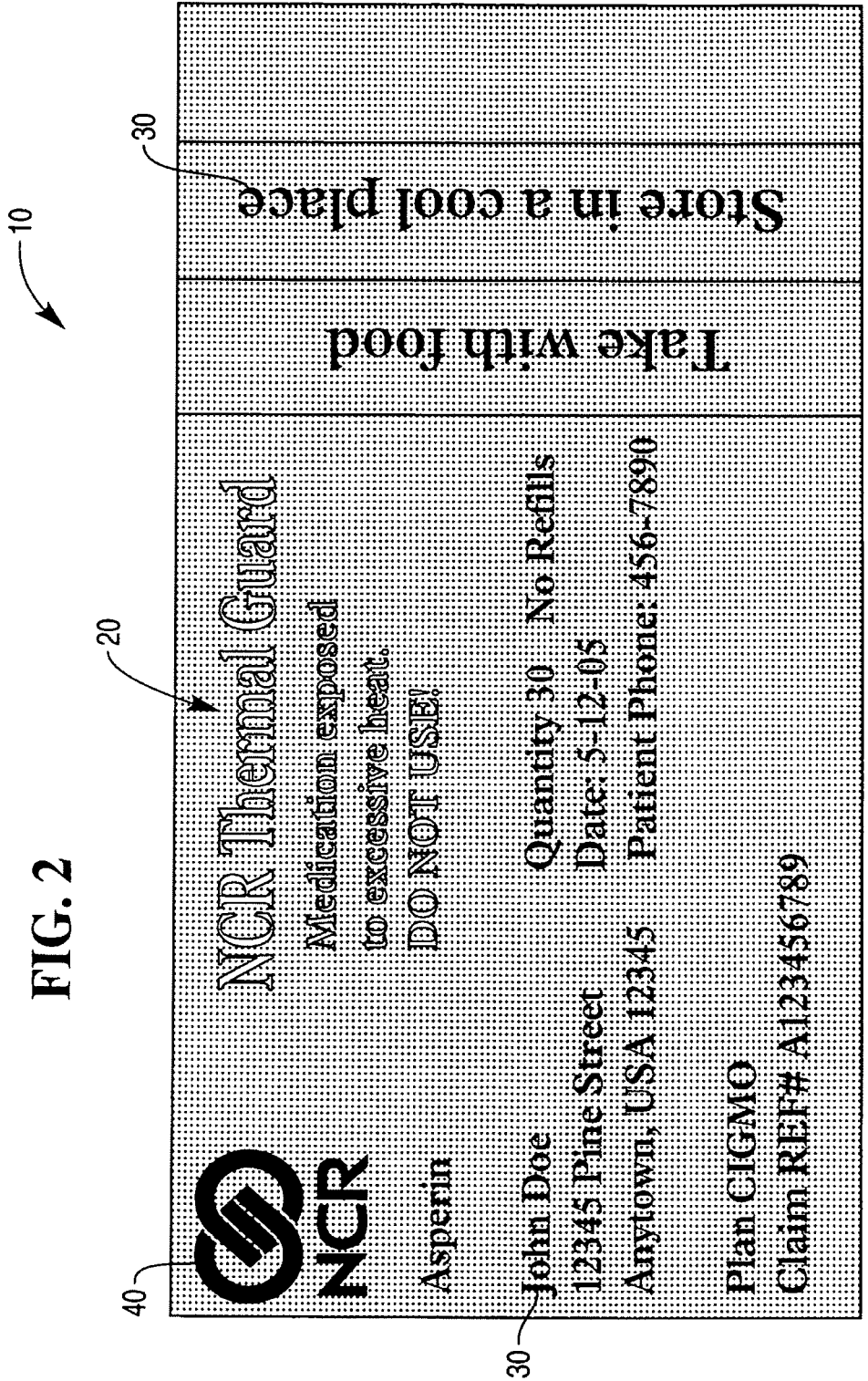
FIG. 2 illustrates the thermally sensitive label of FIG. 1 following exposure to excessive heat, where the opaque printing has been made visible.

When the label 10 is exposed to excessive heat, the background color of the label 10 turns dark, as shown in FIG. 2, exposing the opaque printing 20 and rendering it visible, e.g., to reveal a message. The illustrated label 10 in FIGS. 1 and 2 could be used, for example, for safe guarding medication in pill bottles from excessive thermal exposure. The safe guard would be an integral part of the label on the bottle. In this embodiment the opaque printing 20 is a warning message preferably pre-printed on a white direct thermal label 10 using opaque white ink. The white on white printing is initially invisible. When the label 10 is exposed to excessive temperature the entire label images, or turns dark. The initially invisible white printing 20 becomes visible. This is shown in FIGS. 1 and 2. The activation temperature when the label 10 turns dark can be selected based on requirements for safe guarding particular medication in containers to which the label 10 is applied.

The white warning message or printing 20 may be optimally placed on a portion of the label not thermally imaged by thermal printing 30 or printed with logo 40. This is depicted in FIG. 1. However by adjusting the opacity of the white ink it is possible to place the invisible print 20 on areas 30 of the label 10 that are thermally printed if desired. This can be accomplished by adjusting the opacity of the white to allow the thermally imaged areas 30 to appear gray through the white pre-printing. As long as the thermal printing is sparse an observer will not detect the hidden message 20 before heat activation.

The activation temperature for revealing the hidden message 20 can be adjusted by changing the thermal sensitivity of the label 10. The substantially opaque white message 20 may be applied over a protective layer 25 as desired. Alternatively, or in addition, a substantially transparent protective layer 25 may be applied to the label 10 on top of the printing 20. The label 10 is not limited to white thermal paper and the hidden message 20 is not limited to white opaque ink. Other colors of paper and inks may be used. Similarly, the label 10 is not limited to black thermal imaging, other imaging colors being possible.

In another application of a thermal label or thermal paper 10, the hidden message 20 could be used as a security feature. When the paper 10 is thermally printed an area can be intentionally thermal printed to expose the hidden print 20, authenticating the media.

The foregoing description above presents a number of specific embodiments or examples of a broader invention. The invention is also carried out in a wide variety of other alternative ways which have not been described here. Many other embodiments or variations of the invention may also be carried out within the scope of the following claims.

Figure 3:
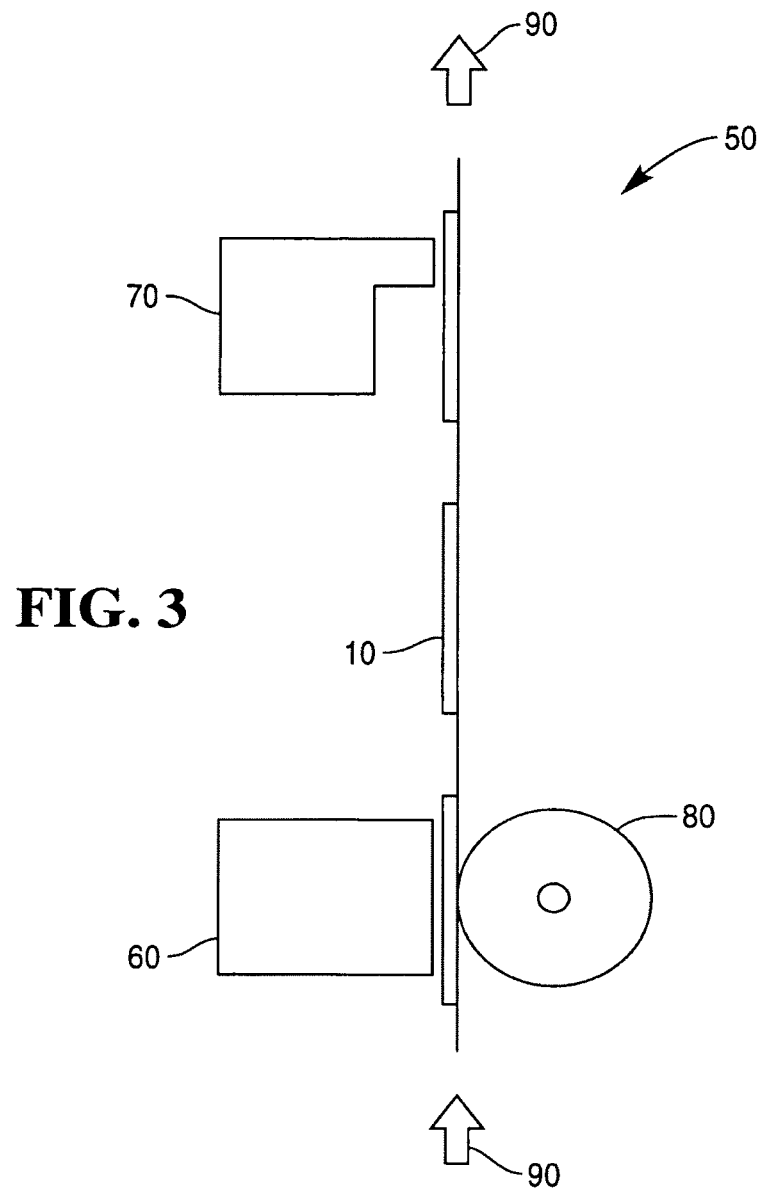
FIG. 3 shows schematically a direct thermal printer with an ink jet print head.

As shown in FIG. 3, a printer 50 for printing of time-temperature indicator labels 10 can be constructed using a direct thermal printing print head 60 to print first indicia 30 on the labels 10, and an ink jet print head 70 to print second indicia 20 on the labels 10, using well known print head technologies. The printer 50 includes a platen 80 opposing the thermal print head 60 and the labels 10 are presented for printing on a web moving through the printer 50 along a feed path 90. Such a printer 50 would comprise a supply of ink (not shown) for the ink jet print head 70, where the ink is of a color that substantially matches that of the thermal media elements 10 prior to activation due to excessive heat.

What is claimed is:

1. A method of hiding and revealing a warning message to indicate whether a label has been exposed to a selectable activation temperature, the method comprising:
   at a first time, printing with ink of a first color the warning message on a first portion of the label having a thermally sensitive coating of an initial color which substantially matches the first color of the warning message to render the first color of the warning message substantially invisible against the initial color of the thermally sensitive coating and thereby to hide the warning message;
   at a second time which is after the first time, applying heat to a second portion of the label which is different from the first portion of the label to provide a non-warning message of a second color on the second portion of the label, wherein the second color of the non-warning message on the second portion of the label is different from the first color of the warning message on the first portion of the label; and
   at a third time which is after the second time, exposing the first portion of the label to the selectable activation temperature to change the thermally sensitive coating from the initial color which substantially matches the first color of the warning message to a different color to render the first color of the warning message visible against the different color of the thermally sensitive coating and thereby to reveal the warning message to indicate that the label has been exposed to the selectable activation temperature.

2. The method of claim 1, wherein (i) the first color is a color which is substantially white, and (ii) the second color is a color which is other than substantially white.

3. The method of claim 2, wherein the second color is a color which is substantially black.

4. The method of claim 1, wherein (i) the first color is a color which is substantially white, and (ii) the second color is a color which is substantially black.

5. A method of hiding and revealing a warning message to indicate whether a label has been exposed to a selectable activation temperature, the method comprising:
   at a first time, printing with ink of a substantially white color from an ink jet print head the warning message on a first portion of the label having a thermally sensitive coating of an initial color which substantially matches the substantially white color of the warning message to render the substantially white color of the warning message substantially invisible against the initial color of the thermally sensitive coating and thereby to hide the warning message;
   at a second time which is after the first time, applying heat from a direct thermal print head to a second portion of the label which is different from the first portion of the label to provide a non-warning message of a color which is other than a substantially white color on the second portion of the label; and
   at a third time which is after the second time, exposing the first portion of the label to the selectable activation temperature to change the thermally sensitive coating from the initial color which substantially matches the substantially white color of the warning message to a different color to render the substantially white color of the warning message visible against the different color of the thermally sensitive coating and thereby to reveal the warning message to indicate that the label has been exposed to the selectable activation temperature.

6. The method of claim 5, wherein the different color to which the thermally sensitive coating changes from the initial color upon exposure to the selectable activation temperature is substantially black.

7. The method of claim 5, wherein the substantially white color of the ink is a substantially opaque white color.

8. The method of claim 5, wherein (i) the different color to which the thermally sensitive coating changes from the initial color upon exposure to the selectable activation temperature is substantially black, and (ii) the substantially white color of the ink is a substantially opaque white color.

9. A method of hiding and revealing a warning message to indicate whether a pharmacy label and an associated medication container for containing temperature-sensitive medications have been exposed to a selectable activation temperature, the method comprising:
   at a first time, printing with ink of a substantially white color the warning message on a first portion of the pharmacy label having a thermally sensitive coating of an initial color which substantially matches the substantially white color of the warning message to render the substantially white color of the warning message substantially invisible against the initial color of the thermally sensitive coating and thereby to hide the warning message;
   at a second time which is after the first time, applying heat to a second portion of the pharmacy label which is different from the first portion of the pharmacy label to provide a non-warning message of a color which is other than a substantially white color on the second portion of the pharmacy label;
   at a third time which is after the second time, attaching the pharmacy label including the warning message and the non-warning message to the medication container; and
   at a fourth time which is after the third time, exposing the first portion of the pharmacy label to the selectable activation temperature to change the thermally sensitive coating from the initial color which substantially matches the substantially white color of the warning message to a different color to render the substantially white color of the warning message visible against the different color of the thermally sensitive coating and thereby to reveal the warning message to indicate that the pharmacy label and the medication container to which the pharmacy label is attached have been exposed to the selectable activation temperature.

10. The method of claim 9, wherein the different color to which the thermally sensitive coating changes from the initial color upon exposure to the selectable activation temperature is substantially black.

11. The method of claim 9, wherein the substantially white color of the ink is a substantially opaque white color.

12. The method of claim 9, wherein (i) the different color to which the thermally sensitive coating changes from the initial color upon exposure to the selectable activation temperature is substantially black, and (ii) the substantially white color of the ink is a substantially opaque white color.

* * * * *